(12) United States Patent
Sadil et al.

(10) Patent No.: US 8,235,345 B2
(45) Date of Patent: Aug. 7, 2012

(54) GAS TURBINE ENGINE SYSTEMS AND RELATED METHODS INVOLVING THERMALLY ISOLATED RETENTION

(75) Inventors: Andreas Sadil, Newington, CT (US); Claude I. Barnett, Jr., Lebanon, CT (US); Ricky A. Daigle, Barkhamsted, CT (US)

(73) Assignee: United Technologies Corp., Hartford, CT (US)

( * ) Notice: Subject to any disclaimer, the term of this patent is extended or adjusted under 35 U.S.C. 154(b) by 1101 days.

(21) Appl. No.: 12/112,470

(22) Filed: Apr. 30, 2008

(65) Prior Publication Data

US 2009/0272123 A1    Nov. 5, 2009

(51) Int. Cl.
*A47B 97/00* (2006.01)
*F16M 13/00* (2006.01)
*D06F 79/02* (2006.01)
*A47G 23/02* (2006.01)
*B65D 63/00* (2006.01)
*B64D 13/00* (2006.01)

(52) U.S. Cl. ...... 248/500; 248/554; 248/503; 248/503.1; 248/424; 248/117.7; 248/154; 248/499; 248/551; 244/118.6

(58) Field of Classification Search .......... 248/554, 248/503, 503.1, 500, 424, 177.4, 117.7, 154, 248/499, 551; 244/118.6
See application file for complete search history.

(56) References Cited

U.S. PATENT DOCUMENTS

| | | | |
|---|---|---|---|
| 1,481,396 A * | 1/1924 | Ternes ............................ | 248/680 |
| 2,399,498 A * | 4/1946 | Messick ......................... | 248/154 |
| 4,048,898 A | 9/1977 | Salter | |
| 4,062,298 A * | 12/1977 | Weik ............................... | 410/105 |
| 4,263,834 A | 4/1981 | Dudash | |
| 4,353,521 A * | 10/1982 | Webb ............................. | 248/552 |
| 4,406,580 A * | 9/1983 | Baran, Jr. ....................... | 415/118 |
| 4,422,300 A | 12/1983 | Dierberger et al. | |
| 4,449,877 A | 5/1984 | Kessler | |
| 4,555,083 A * | 11/1985 | Carter ............................. | 248/313 |
| 4,669,173 A * | 6/1987 | Chaney, Sr. .................. | 29/525.12 |
| 4,921,401 A | 5/1990 | Hall et al. | |
| 5,320,193 A * | 6/1994 | Bongiovanni et al. ............ | 182/3 |
| 5,449,132 A * | 9/1995 | Gilbert ........................ | 244/122 R |
| 5,456,443 A * | 10/1995 | Taaffe ............................. | 248/551 |
| 5,520,357 A * | 5/1996 | Payne et al. ................. | 244/118.1 |
| 5,569,008 A * | 10/1996 | Chapkovich .................. | 411/383 |
| 5,909,862 A * | 6/1999 | Ratliff et al. ................ | 248/117.4 |
| 6,092,987 A | 7/2000 | Honda et al. | |
| 6,370,772 B1 | 4/2002 | Honda et al. | |
| 6,699,248 B2 | 3/2004 | Jackson | |
| 6,872,041 B2 | 3/2005 | Lohr | |
| 6,971,623 B2 * | 12/2005 | Allmon et al. ................. | 248/680 |
| 7,153,075 B2 | 12/2006 | Sommer et al. | |
| 7,232,096 B1 * | 6/2007 | Ahad .......................... | 244/118.6 |
| 7,334,758 B2 * | 2/2008 | Williamson et al. ........ | 244/118.6 |
| 7,758,104 B2 * | 7/2010 | Liebl et al. .................. | 296/190.1 |
| 2005/0125985 A1 * | 6/2005 | Adams et al. ................. | 29/524.1 |

(Continued)

*Primary Examiner* — Terrell McKinnon
*Assistant Examiner* — Christopher Garft
(74) *Attorney, Agent, or Firm* — Carlson, Gaskey & Olds, P.C.

(57) ABSTRACT

Gas turbine engine systems and related methods involving thermally isolated retention are provided. In this regard, a representative method for attaching a gas turbine engine component includes using a fastener, varying in diameter along a length thereof, to prevent a portion of a component from being crimped between surfaces to which the component is attached such that the component moves relative to the surfaces responsive to thermal cycling of a gas turbine engine of which the surfaces and the component are constituent parts.

14 Claims, 4 Drawing Sheets

U.S. PATENT DOCUMENTS

2006/0067806 A1* 3/2006 Denslow ................ 411/504
2007/0228249 A1* 10/2007 Ponzo De Siqueira ....... 248/503
2007/0237602 A1* 10/2007 Xia et al. ................ 411/178
2008/0098742 A1* 5/2008 Sadil et al. ................ 60/770
2009/0321606 A1* 12/2009 Wilhelm et al. ........... 248/503
2011/0120084 A1* 5/2011 Sadil et al. ................ 60/230

* cited by examiner

GAS TURBINE ENGINE SYSTEMS AND RELATED METHODS INVOLVING THERMALLY ISOLATED RETENTION

STATEMENT REGARDING FEDERALLY SPONSORED RESEARCH AND DEVELOPMENT

The U.S. Government may have an interest in the subject matter of this disclosure as provided for by the terms of contract number N00019-02-C-3003 awarded by the United States Navy.

BACKGROUND

1. Technical Field

The disclosure generally relates to gas turbine engines.

2. Description of the Related Art

Gas turbine engines, particularly turbojet engines for military use, may incorporate augmentors (afterburners) for increasing thrust. The use of augmentors tends to increase stresses on various components, such as the components used to form the augmentors. For instance, these stresses can be manifest as thrust-induced and thermally-induced stresses.

SUMMARY

Gas turbine engine systems and related methods involving thermally isolated retention are provided. In this regard, an exemplary embodiment of an assembly for a gas turbine engine comprises: a mounting surface having a first flange portion and a first mounting orifice, the first flange portion having a first underside, a first aperture and a first free end, the first underside being spaced from and adjacent to the mounting surface such that a first channel is formed therebetween, the first aperture being aligned with the first mounting orifice; a first component having a first body and a first leg, the first leg extending outwardly from the first body, the first leg having a first recess, the first leg being sized and shaped to be positioned at least partially within the first channel; and a first fastener having a first diameter portion and a second diameter portion, the second diameter portion being narrower than the first diameter portion, the first fastener being fastened to the mounting surface and the first flange with the first diameter portion extending through the first mounting orifice and the first recess, and the second diameter portion extending through the first aperture of the first flange such that the first fastener maintains a spacing between the first underside of the first flange and the mounting surface for permitting movement of the component relative to the mounting surface during thermal cycling of the gas turbine engine.

An exemplary embodiment of a method for attaching a gas turbine engine component comprises using a fastener, varying in diameter along a length thereof, to prevent a portion of a component from being crimped between surfaces to which the component is attached such that the component moves relative to the surfaces responsive to thermal cycling of a gas turbine engine of which the surfaces and the component are constituent parts.

An exemplary embodiment of a gas turbine engine comprises: a compressor section; a turbine section operative to drive the compressor section; and an exhaust section located downstream of the turbine section, the exhaust section having an augmentor assembly, the augmentor assembly having a spray bar assembly and a flame holder assembly, the spray bar assembly being operative to provide a spray of fuel for augmentation of the gas turbine engine, the flame holder assembly having a mounting surface, a fastener and a floating lug, the floating lug being operative to support the spray bar assembly, the mounting surface having a first flange portion defining a first channel, a first portion of the first lug being positioned within the first channel the fastener extending through the mounting surface and the first flange portion, the fastener being operative to prevent the portion of the floating lug located within the first channel from being crimped between the mounting surface and the first flange portion.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems and related methods involving thermally isolated retention are provided, several exemplary embodiments of which will be described in detail. In this regard, retention features are used to accommodate disparate thermal expansion and contraction between components that are attached to each other. In some embodiments, the components are floating lugs that are configured to move with respect to the mounting surfaces to which the lugs are attached. By way of example, the floating lugs are attached using stepped rivets, which incorporate steps (locations of diameter change) for maintaining control gaps. The control gaps facilitate movement of the floating lugs after deformation of the rivets by preventing crimping of adjacent material about the lug. In some embodiments, the floating lugs can be used in combination with fixed lugs.

Figure 1:
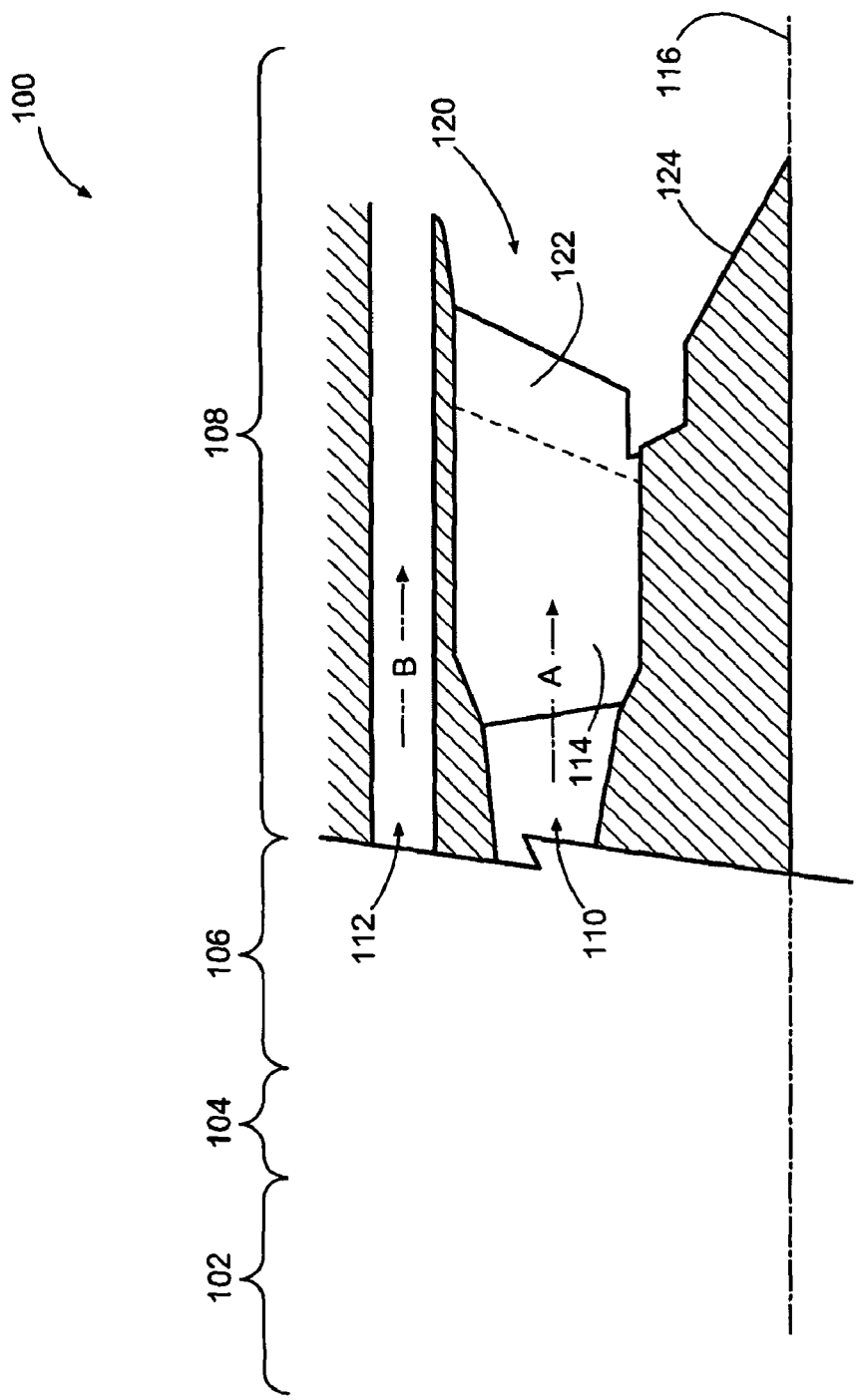
FIG. 1 is a schematic diagram depicting an exemplary embodiment of a gas turbine engine.

Reference is now made to the schematic diagram of FIG. 1, which depicts an exemplary embodiment of a gas turbine engine. Specifically, engine 100 is a turbofan that incorporates a compressor section 102, a combustion section 104, a turbine section 106 and an exhaust section 108. Although depicted as a turbofan gas turbine engine, it should be understood that the concepts described herein are not limited to use with turbojets as the teachings may be applied to other types of gas turbine engines.

As shown in the embodiment of FIG. 1, exhaust section 108 defines a core gas path 110 directing a core flow of gas (depicted by arrow A), and a bypass gas path 112 directing a bypass flow of gas (depicted by arrow B). Multiple vanes (e.g., vane 114) are positioned circumferentially about a longitudinal axis 116 of the engine, with various components of an augmentor assembly 120 being supported by the vanes. By way of example, a trailing edge box 122 of vane 114 (described in greater detail with respect to FIG. 2) mounts a spray bar assembly for providing a spray of fuel for augmentation and a flame holder assembly for facilitating combustion of the spray of fuel. A tailcone 124 also is located in the exhaust section.

Figure 2:
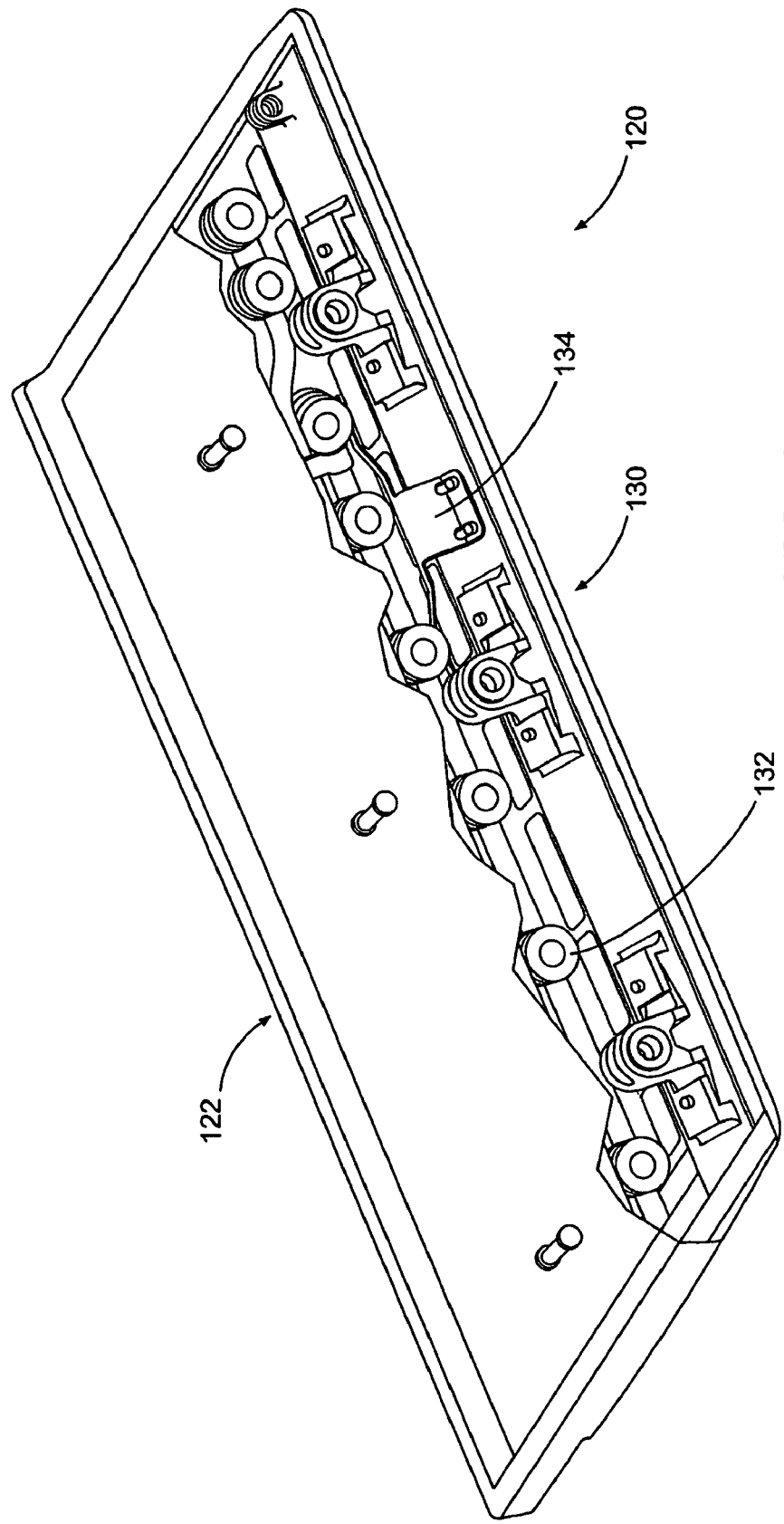
FIG. 2 is a schematic diagram depicting a portion of the embodiment of FIG. 1.

As shown in FIG. 2, augmentor assembly 120 includes a flame holder assembly 130 and a spray bar assembly 132, both of which are mounted to trailing edge box 122. As the names imply, the spray bar assembly routes fuel to spray nozzles that provide sprays of fuel for augmentation; and the flame holder assembly provides ignition for the sprays of fuel. Flame holder assembly 130 is shown in greater detail in FIG. 3.

Figure 3:
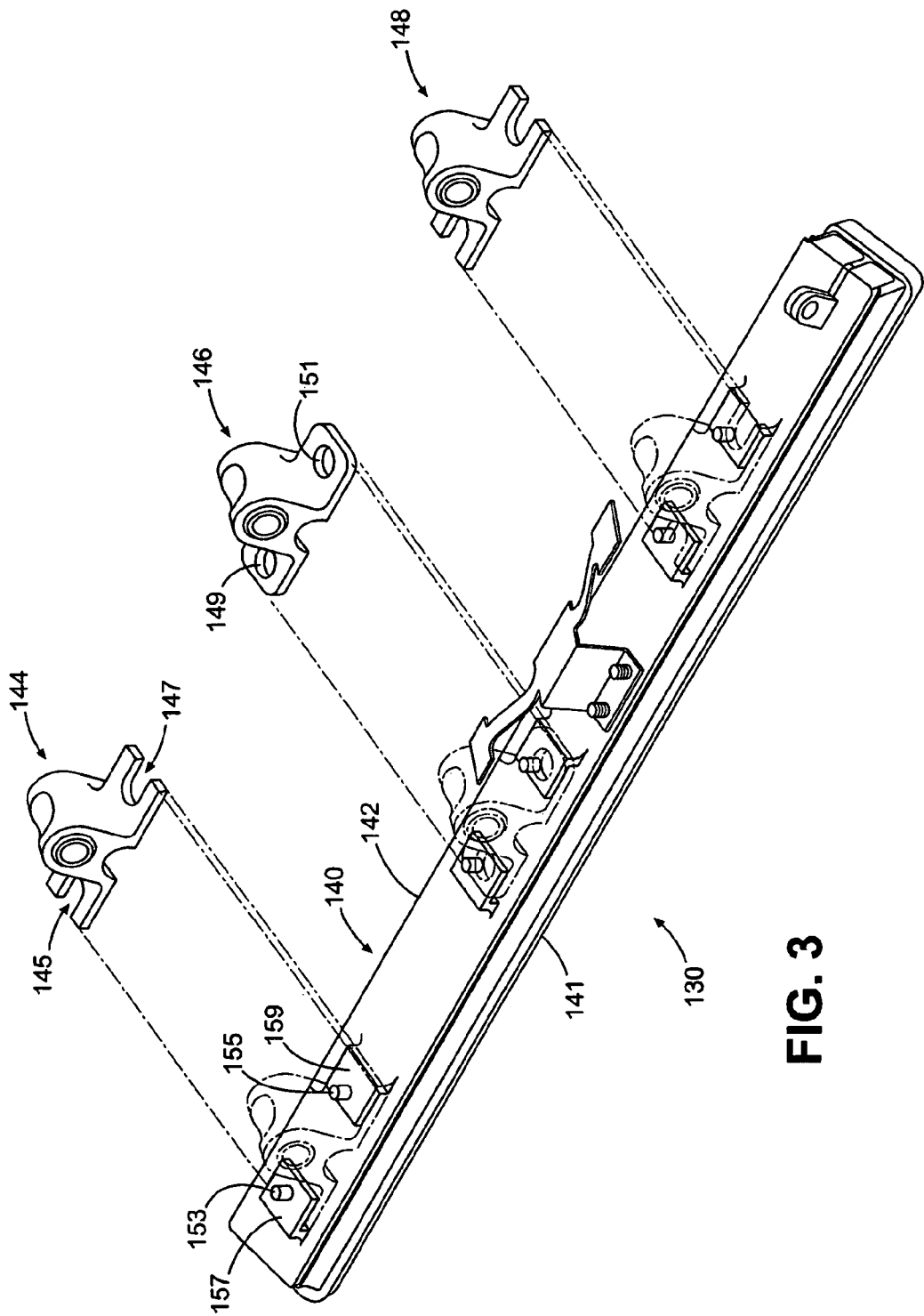
FIG. 3 is an assembly diagram depicting the flame holder assembly of embodiment of FIGS. 1 and 2.

As shown in FIG. 3, flame holder assembly 130 includes an impingement sheet assembly 140 that is elongate and which includes a base 141 and a mounting surface 142. Mounting surface 142 mounts a series of lugs (e.g., lug 144) that attach the flame holder assembly to the trailing edge box 122 (FIG. 2). Notably, the lugs are shown in respective mounted positions in phantom lines.

In the embodiment of FIG. 3, two types of lugs are used. Specifically, lugs 144, 146 are floating lugs and lug 148 is a fixed lug. The floating lugs differ from the fixed lug in this embodiment by incorporating recesses (e.g., recesses 145, 147) for receiving fasteners, whereas the fixed lug incorporates through holes (e.g., holes 149, 151). The recesses enable the floating lugs to slide relative to the mounting surface 142 even though movement away from the mounting surface is restricted by fasteners (e.g., rivets 153, 155). Notably, the lugs are fastened to flange portions (e.g., portions 157, 159) that extend from the mounting surface 142.

Figure 4:
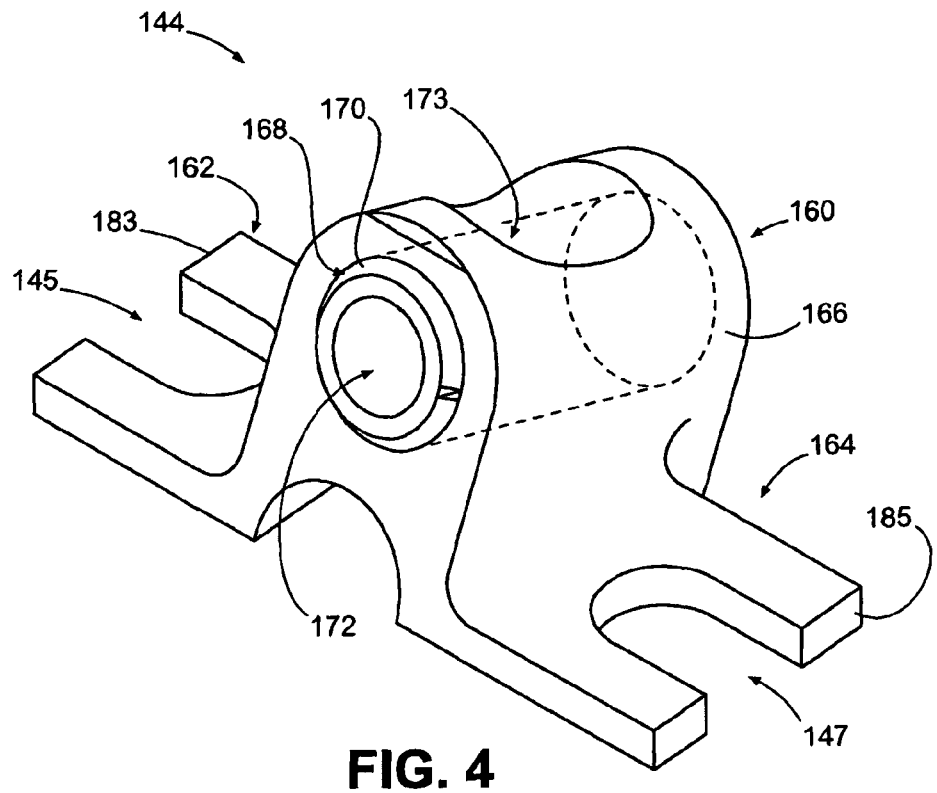
FIG. 4 depicts exemplary embodiment of a floating lug.
Figure 5:
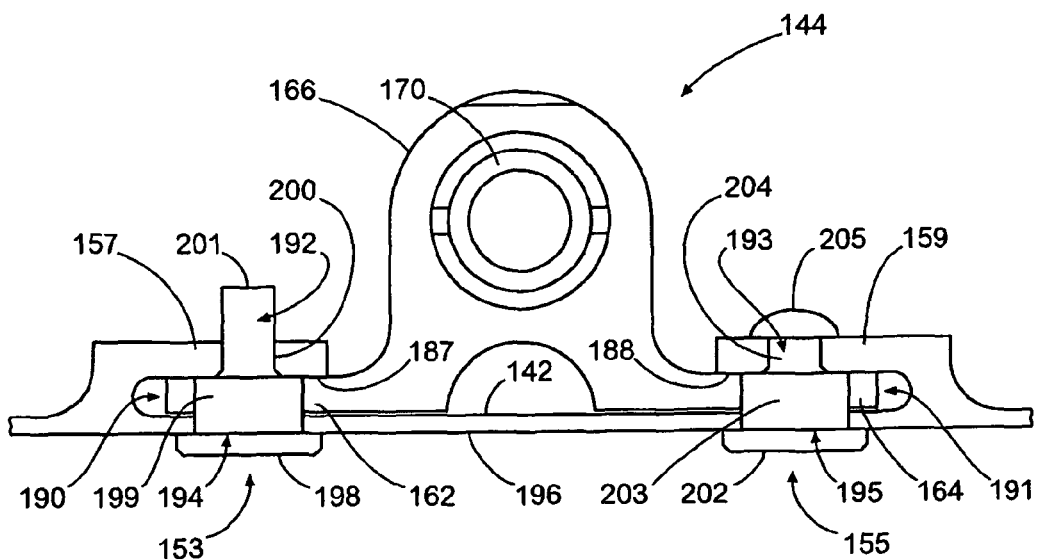
FIG. 5 is schematic diagram depicting an embodiment of a portion of a flame holder assembly showing mounting detail of a floating lug.

As shown in greater detail in FIGS. 4 and 5, floating lug 144 includes a body 160, with legs 162 and 164 extending from the body. The body incorporates a housing 166 that defines an interior cavity 168. One or more inserts (e.g., insert 170) are mounted within cavity 168. In this embodiment, insert 170 includes an internally threaded bore 172 that is sized to receive an externally threaded bolt (not shown). Such a bolt is used to attach the flame holder assembly to the trailing edge box 122 (FIG. 2). A cut-out 173 is provided in an upper portion of the housing in this embodiment as a clearance feature for enabling positioning of the lug adjacent to other components.

As shown in FIG. 4, leg 162 incorporates recess 145, and leg 164 incorporates a recess 147. The recesses open to contact free ends 183, 185, respectively, of the legs.

FIG. 5 schematically depicts lug 144 attached to mounting surface 142, showing the interrelationship between the lug, the mounting surface and fasteners 153, 155. As shown in FIG. 5, mounting surface 142 includes flange portions 157, 159, with undersides 187, 188 of the flange portions defining channels 190, 191 that are sized to receive the legs of floating lug 144. Additionally, each of the flange portions includes a corresponding aperture 192, 193, with each of the apertures aligning with a corresponding mounting orifice (194, 195) formed through mounting surface 142.

Fasteners 153, 155 (which vary in diameter along their respective lengths) are used to secure lug 144 within channels 190, 191. In this embodiment, the fasteners are rivets mounted from an underside 196 of the mounting surface. Fastener 153 includes a head 198, a first diameter portion 199, and a second diameter portion 200 extending between portion 199 and a tip 201. Similarly, fastener 155 includes a head 202, a first diameter portion 203, and a second diameter portion 204 extending between portion 203 and a tip 205. Notably, tip 205 of fastener 155 is crimped to provide retention of leg 164 within channel 191.

As shown in FIG. 5, fastener 153 extends through mounting orifice 194, recess 145 of the lug and then through aperture 192 of flange portion 157. In particular, a length of first diameter portion 199 is configured to maintain a desired clearance between mounting surface 142 and the underside 187 of flange portion 157. Thus, even after crimping (as shown with respect to fastener 155), the desired spacing is established by the first diameter portion is preserved. As such, the lug is capable of sliding within the opposing channel 190, 191 as permitted by clearance between the surfaces of the legs forming the recesses 145, 147 and the first diameter portions of the fasteners 153, 157.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. An assembly for a gas turbine engine comprising:
a mounting surface having a first flange portion and a first mounting orifice, the first flange portion having a first underside, a first aperture and a first free end, the first underside being spaced from and adjacent to the mounting surface such that a first channel is formed therebetween, the first aperture being aligned with the first mounting orifice;
a first component having a first body and a first leg, the first leg extending outwardly from the first body, the first leg having a first recess, the first leg being sized and shaped to be positioned at least partially within the first channel; and
a first fastener having a first diameter portion and a second diameter portion, the second diameter portion being narrower than the first diameter portion, the first fastener being fastened to the mounting surface and the first flange with the first diameter portion extending through the first mounting orifice and the first recess, and the second diameter portion extending through the first aperture of the first flange such that the first fastener maintains a spacing between the first underside of the first flange and the mounting surface for permitting movement of the component relative to the mounting surface during thermal cycling of the gas turbine engine.

2. The assembly of claim 1, wherein:
the mounting surface has a second flange portion and a second mounting orifice;
the second flange portion has a second underside, a second aperture and a second free end, the second underside being spaced from and adjacent to the mounting surface such that a second channel is formed therebetween;
the second aperture is aligned with the second mounting orifice; and
a first end being spaced from the second end such that a gap is formed therebetween.

3. The assembly of claim 2, wherein:
the component has a second leg extending outwardly from the body, the second leg having a second recess and being sized and shaped to be positioned at least partially within the second channel.

4. The assembly of claim 3, further comprising:

a second fastener having a first diameter portion and a second diameter portion, the second diameter portion of the second fastener being narrower than the first diameter portion of the second fastener, the second fastener being fastened to the mounting surface and the second flange with the first diameter portion of the second fastener extending through the second mounting orifice and the second recess, and the second diameter portion of the second fastener extending through the second aperture of the second flange such that the second fastener maintains a spacing between the second underside of the second flange and the mounting surface for permitting movement of the component relative to the mounting surface during thermal cycling of the gas turbine engine.

5. The assembly of claim 1, wherein the movement of the first component relative to the mounting surface comprises sliding movement.

6. The assembly of claim 1, wherein the first fastener is a rivet.

7. The assembly of claim 1, wherein the first body of the first component has a first housing and a first bore extending at least partially through the first housing.

8. The assembly of claim 1, wherein the mounting surface is a mounting surface of a flame holder assembly of a gas turbine engine augmentor.

9. The assembly of claim 1, wherein:

the first fastener has a head and a tip;

the head is located such that the mounting surface is positioned between the head and the first leg.

10. The assembly of claim 9, wherein the tip is located such that the first flange is positioned between the tip and the first leg.

11. The assembly of claim 9, wherein the first diameter portion extends between the head and the second diameter portion.

12. The assembly of claim 1, wherein:

the mounting surface has a third flange portion and a third mounting orifice, the third flange portion having a third underside, a third aperture and a third free end, the third underside being spaced from and adjacent to the mounting surface such that a third channel is formed therebetween, the third aperture being aligned with the third mounting orifice;

the assembly further comprises a second component having a body and a first leg, the first leg of the second component being sized and shaped to be positioned at least partially within the third channel.

13. The assembly of claim 12, wherein the second component is attached to the mounting surface such that the second component moves relative to the mounting surface.

14. The assembly of claim 12, wherein the second component is attached to the mounting surface such that the second component is fixed relative to the mounting surface.

\* \* \* \* \*